US012613735B2

(12) United States Patent (10) Patent No.: US 12,613,735 B2
Dees (45) Date of Patent: Apr. 28, 2026

(54) SYSTEM, METHOD, AND UTILITY FOR SAP START/STOP AUTOMATION

(71) Applicant: Insight Direct USA, Inc., Chandler, AZ (US)

(72) Inventor: Bradley Dees, Galveston, TX (US)

(73) Assignee: Insight Direct USA, Inc., Chandler, AZ (US)

( * ) Notice: Subject to any disclaimer, the term of this patent is extended or adjusted under 35 U.S.C. 154(b) by 434 days.

(21) Appl. No.: 18/141,676

(22) Filed: May 1, 2023

(65) Prior Publication Data

US 2024/0345871 A1 Oct. 17, 2024

Related U.S. Application Data

(60) Provisional application No. 63/459,502, filed on Apr. 14, 2023.

(51) Int. Cl.
*G06F 9/46* (2006.01)
*G06F 9/48* (2006.01)

(52) U.S. Cl.
CPC ................................... *G06F 9/485* (2013.01)

(58) Field of Classification Search
CPC ....................................................... G06F 9/485
See application file for complete search history.

(56) References Cited

U.S. PATENT DOCUMENTS 7,533,163 B1 5/2009 Zenz et al.
7,917,629 B2 3/2011 Werner

| | | |
|---|---|---|
| 7,925,764 B2 | 4/2011 | Charters et al. |
| 8,015,541 B1 | 9/2011 | Srinivasan et al. |
| 8,290,998 B2 | 10/2012 | Stienhans et al. |
| 9,209,992 B2 | 12/2015 | Nelke et al. |
| 9,785,516 B2 | 10/2017 | Schefe et al. |
| 9,994,438 B2 | 6/2018 | Sahiner |
| 10,496,677 B2 | 12/2019 | Voss et al. |
| 10,747,730 B2 | 8/2020 | Dimitrov et al. |
| 11,068,241 B2 | 7/2021 | Swope et al. |
| 11,507,897 B2 | 11/2022 | Partridge |
| 2003/0172002 A1 | 9/2003 | Spira et al. |

FOREIGN PATENT DOCUMENTS

| | | |
|---|---|---|
| AT | 451780 T | 12/2009 |
| CA | 2795756 C | 5/2020 |
| CN | 104484730 B | 3/2018 |

(Continued)

*Primary Examiner* — Gregory A Kessler
(74) *Attorney, Agent, or Firm* — Kinney & Lange, P.A.

(57) ABSTRACT

A method of starting and stopping SAP processes across a plurality of servers via an SAP start/stop utility is presented. A system-scale SAP start/stop script is executed by specifying an action and a type, the action identifying one of START, STOP, and RESTART, the type identifying categories of server to be stopped or started, the categories comprising database servers, message servers, and application servers. In response to the action including STOP or RESTART, the system-scale SAP start/stop script halts, in order and among servers in categories matching the type: application servers, message servers, and database servers. In response to the action including START or RESTART, the system-scale SAP start/stop script then starts, in order and among servers in categories matching the type: database servers, message servers, and application servers.

20 Claims, 6 Drawing Sheets

(56) References Cited

FOREIGN PATENT DOCUMENTS

| CN | 111240950 | B | 8/2022 |
| CN | 110222960 | B | 11/2022 |
| CN | 110989983 | B | 11/2022 |
| CN | 115048205 | B | 2/2023 |
| EP | 1250669 | A4 | 10/2006 |
| FR | 3075528 | B1 | 11/2019 |
| JP | 2003529952 | A | 10/2003 |
| KR | 102392359 | B1 | 5/2022 |
| TW | I335533 | B | 1/2011 |
| ZA | 201805385 | B | 7/2022 |

FIG. 6

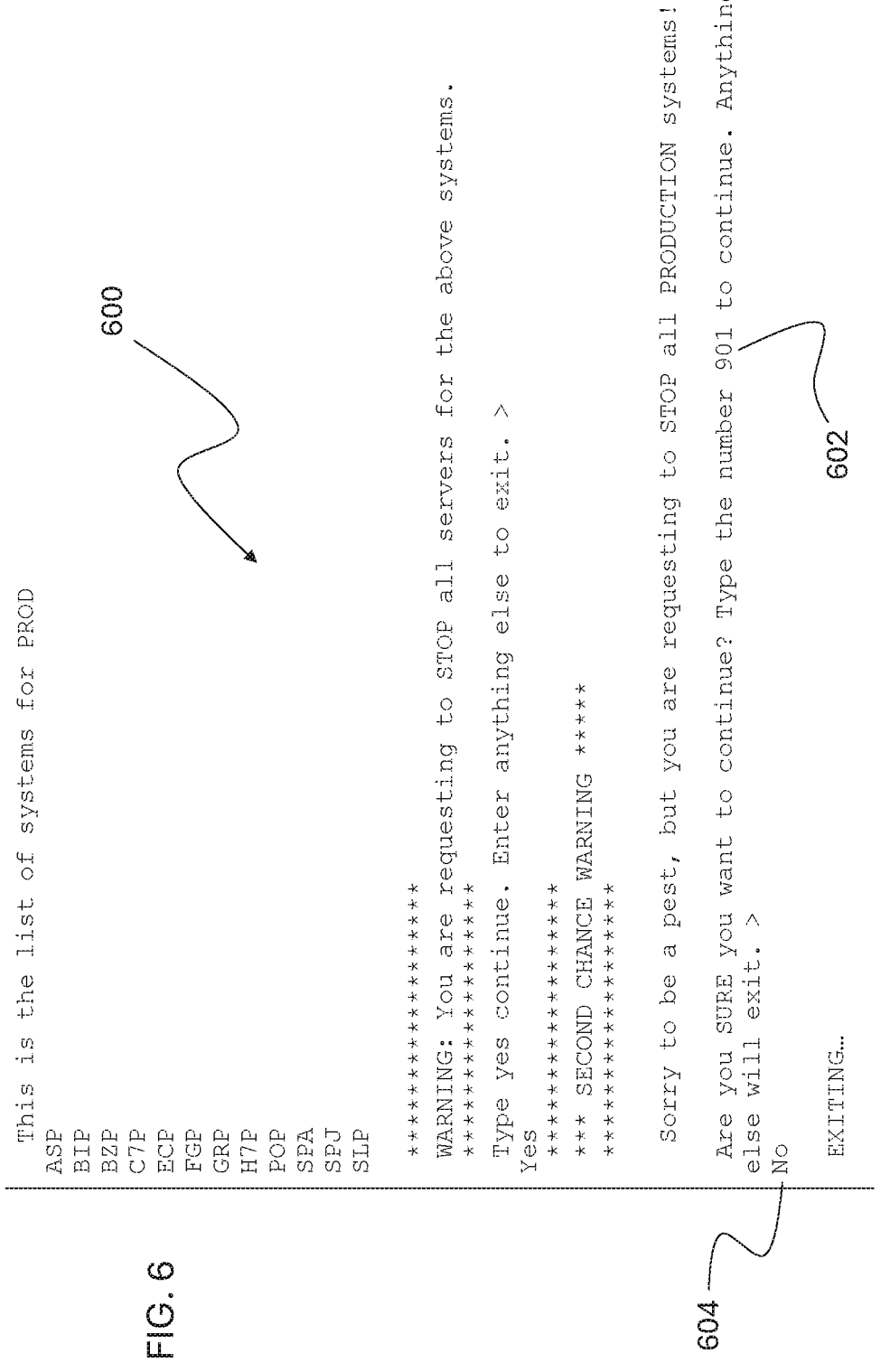

This is the list of systems for PROD

ASP
BIP
BZP
C7P
ECP
FGP
GRP
H7P
POP
SPA
SPJ
SLP

**********************
WARNING: You are requesting to STOP all servers for the above systems.
**********************
Type yes continue. Enter anything else to exit. >
Yes
**********************
* SECOND CHANCE WARNING ***
**********************

Sorry to be a pest, but you are requesting to STOP all PRODUCTION systems!

Are you SURE you want to continue? Type the number 901 to continue. Anything else will exit. >
No

EXITING...

600

602

604

SYSTEM, METHOD, AND UTILITY FOR SAP START/STOP AUTOMATION

CROSS-REFERENCE TO RELATED APPLICATION(S)

The present application claims priority to U.S. provisional patent application Ser. No. 63/459,502 by B. Dees, filed Apr. 14, 2023 and entitled "SYSTEM, METHOD, AND UTILITY FOR SAP START/STOP AUTOMATION."

BACKGROUND

The present disclosure relates generally to distributed system management for enterprise computing, and more particularly to a utility (with associated system and method) for automating the shutdown, starting, restarting, and testing of SAP systems.

SAP ("Systemanalyse Programmentwicklung." i.e. System Analysis Program Development) systems provide distributed platforms for hosting software environments, and are commonly used in software production, testing, and deployment. In contemporary SAP platforms, many functions that might have previously been co-located in a common central instance server are instead distributed across separate servers such as dedicated SCS (message) and application servers. A single environment may, for example, encompass a multitude of separate servers including a database server, a message server, and several application servers. In some instances, a software environment (e.g. a production environment) may be distributed across dozens of separate servers. When SAP systems are to be shut down or restarted, such as during regular maintenance and for patching or upgrades, each of these servers must be individually stopped and/or started, and often in specific orders. Although scripts already exist (e.g. "stopsap r3," "startsap." "stopdb." "startdb") to shut down and restart individual servers, the shutdown or startup of an entire SAP platform, or of all servers within a particular environment or system of an SAP platform, can be complex and time consuming, sometimes taking several hours of operator time across multiple a team of administrators.

There exists a need for mechanisms enabling faster and less burdensome stopping and starting of SAP systems in bulk, so as to reduce downtime, opportunity for error, and administrator workload.

SUMMARY

This disclosure presents a method of starting and stopping SAP processes across a plurality of servers via an SAP start/stop utility. A system-scale SAP start/stop script is executed by specifying an action and a type, the action identifying one of START, STOP, and RESTART, the type identifying categories of server to be stopped or started, the categories including database servers, message servers, and application servers. In response to the action including STOP or RESTART, the system-scale SAP start/stop script halts, in order and among servers in categories matching the type: application servers, message servers, and database servers. In response to the action including START or RESTART, the system-scale SAP start/stop script then starts, in order and among servers in categories matching the type: database servers, message servers, and application servers.

This disclosure also presents an SAP platform with a multitude of servers. The SAP platform includes multiple software environments, each including at least one system encompassing a database server, a message server, and an application server. The SAP platform also includes an SAP admin terminal and an SAP start/stop utility distributed across the SAP admin terminal and each of the database servers. The SAP admin terminal is communicatively coupled to all of the servers, and includes a user interface. The start/stop utility is configured to receive arguments via the user interface specifying an action and a server type, and halt and/or start SAP processes on a subset of the servers matching the specified server type depending on arguments provided to the SAP start/stop utility via the SAP admin terminal.

The present summary is provided only by way of example, and not limitation. Other aspects of the present disclosure will be appreciated in view of the entirety of the present disclosure, including the entire text, claims, and accompanying figures.

BRIEF DESCRIPTION OF THE DRAWINGS

FIG. 6 is a user interface printout illustrating a confirmation prompt generated when using the system group-level script of FIG. 5.

Figure 1:
FIG. 1 is a block diagram of an SAP platform encompassing a plurality of environments each including multiple systems.
Figure 1:
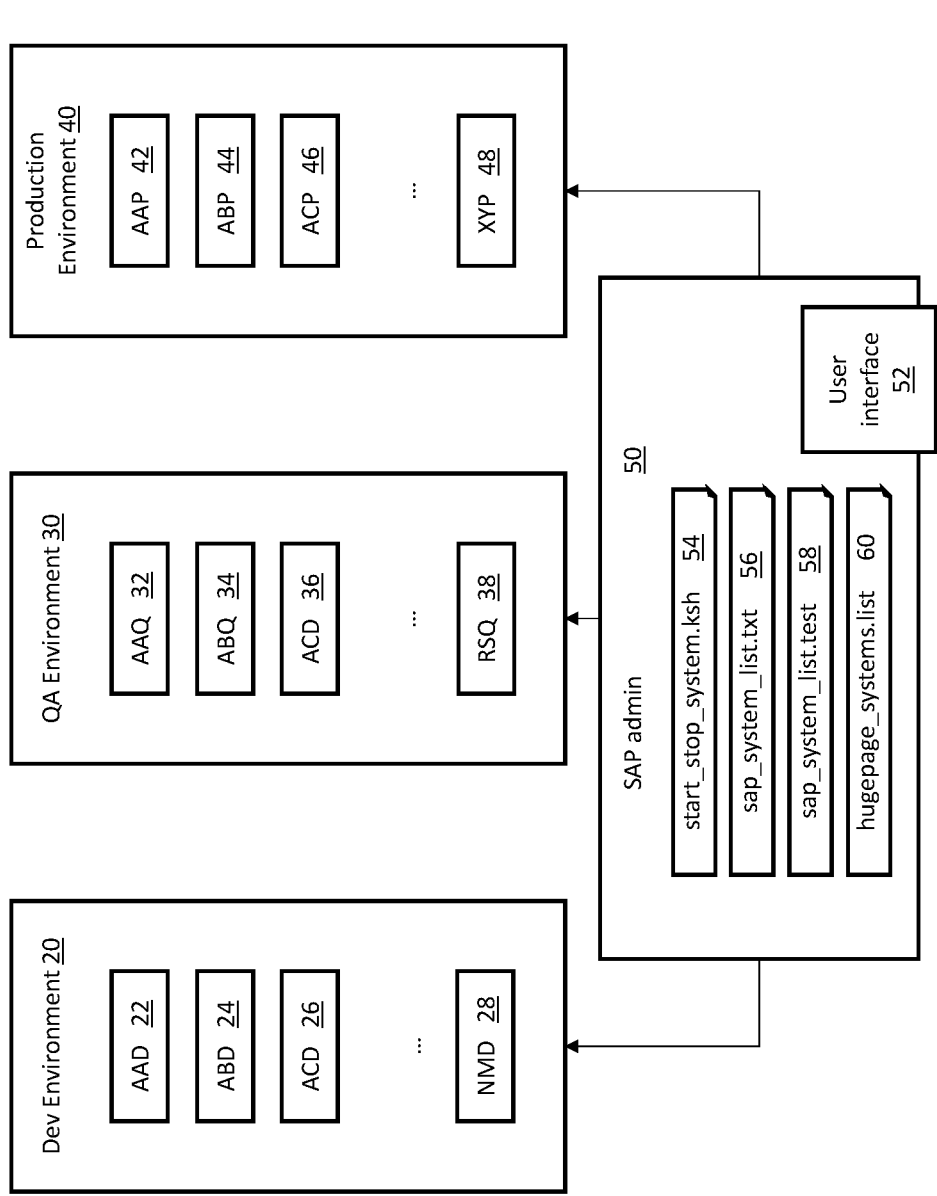

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents an SAP start/stop utility and associated systems, methods, scripts, and modules. This utility assists in the starting, stopping, and restarting of large groups of SAP servers, such as all or specific types of servers within specified environments and systems, by automating the making of connections to each pertinent server and the running of shutdown and startup scripts appropriate to each such server. Where a group of human administrators might in total require hours of activity to connect to each appropriate server and run all appropriate scripts, in order, the SAP start/stop utility allows a single administrator to accomplish the same task in minutes with greatly reduced manual input and less opportunity for error in the space of minutes. Furthermore, the SAP start/stop utility includes checks of system status and protections against inadvertent shutdowns.

Figure 2:
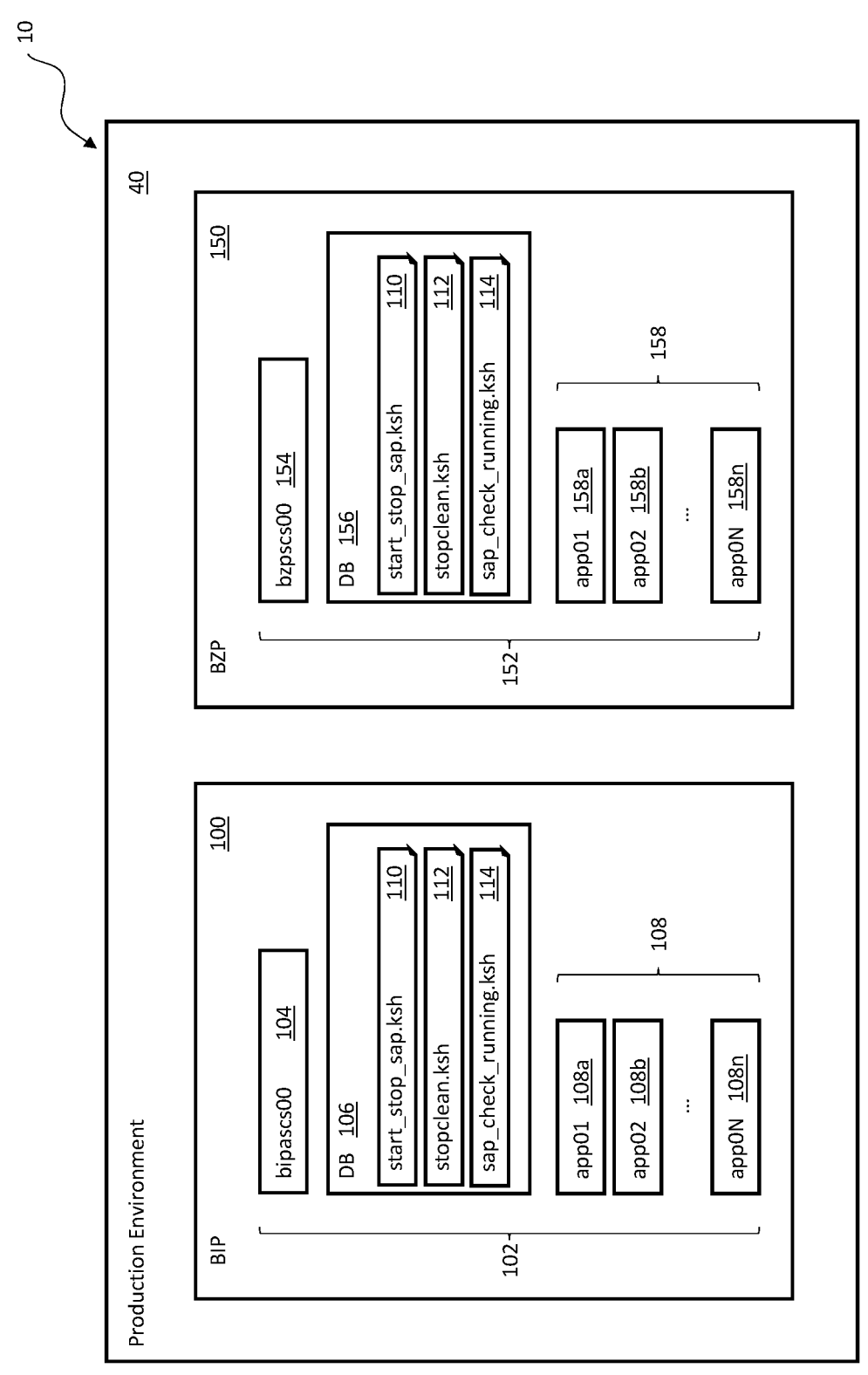
FIG. 2 is a block diagram of two illustrative systems from an environment on the SAP platform of FIG. 1, illustrating servers thereof.

FIGS. 1 and 2 are block diagrams depicting nested taxonomic levels of SAP platform 10. FIG. 1 illustrates a plurality of environments within SAP platform 10, each environment containing multiple systems. FIG. 2 is a close-up view of two exemplary systems (BIP and BZP) within an environment on SAP platform 10, illustrating the various servers that make up these systems. FIGS. 1 and 2 will be described together.

SAP platform 10 is an enterprise computing platform. Although SAP platform 10 is described with reference to particular exemplary environments and systems, in the most general case SAP platform can encompass any number of distinct systems distributed across multiple environments or other groupings. FIG. 1 illustrates three such environments: dev environment 20, quality assurance (QA) environment 30, and production environment 40. Although the present specification focuses on groupings of systems by environment, systems can additionally or alternatively be grouped by other categories, and in some variants of SAP platform 10 these groupings may overlap. Development environment 20, QA environment 30, and production environment 40 are offered as non-limiting examples of common types software development environments, but SAP platform 10 can include other environments, e.g. multiple development or QA environments, or environments defined by other uses.

Each environment 20, 30, or 40 encompasses a plurality of systems comprised of multiple servers (see FIG. 2). The usefulness of the SAP utility presented herein is most apparent when SAP platform 10 includes a large number of separate systems, which may be distributed across multiple environments, as shown. In the illustrated example, dev environment 20 includes systems 22, 24, 26, and 28 (labeled AAD, ABD, ACD, and NMD, respectively); QA environment includes systems 32, 34, 36, and 38 (labeled AAQ, ABQ, ACD, and RSQ, respectively); and production environment 40 includes systems 42, 44, 46, and 48 (labeled AAp, ABP, ACP, and XYP, respectively). The labels provided for each of these system serve as system IDs (SIDs) for their respective systems, but are provide purely by way of non-limiting example. SIDs in each environment can, for example, denote the function and/or environment of the respective system (e.g. xxD for development environments or xxP for production environments), but this is not required. Although four systems are depicted in each environment, each environment can encompass any number of systems, and the number of systems in each environment can vary. Systems can be defined functionally, and in many cases at least a subset of the systems in one environment can have counterparts in other environments. FIG. 2 illustrates two systems 100 and 150, for example—with SIDs BIP and BZP—in production environment 40. These systems can, for illustrative purposes, be production instances of a business intelligence (BI) system (100) and a BI access portal system (150), respectively, which can have counterparts at different development states in QA environment 30, dev environment 20, and/or other environments.

All systems 22-28, 32-38, and 42-48 are handled via multiple distinct servers. In general, each such system includes a message server, a database server, and at least one application server. Following the example illustrated in FIG. 2, BI system (production) 100 includes message server 104, database server 106, and application servers 108a-n, while BI access portal system (production) 150 includes message server 154, database server 156, and application servers 158a-n. As described herein, the term "server" can refer to a discrete physical machine with associated computing hardware. More commonly, however, the servers making up systems of SAP platform 10 can be virtual machines, with a common pool of computing hardware shared across multiple servers. In either case, the functional modules illustrated in FIGS. 1, 2, and 3 of the present disclosure are implemented via computer hardware including computer-readable storage media and logic processors.

In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). System memory 42 can include volatile and non-volatile computer-readable memories. Examples of volatile memories can include random access memories (RAM), dynamic random access memories (DRAM), static random access memories (SRAM), and other forms of volatile memories. Examples of non-volatile memories can include, e.g., magnetic hard discs, optical discs, flash memories, or forms of electrically programmable memories (EPROM) or electrically erasable and programmable (EEPROM) memories. In some examples, logic processors can include any one or more of a microprocessor, a controller, a digital signal processor (DSP), an application specific integrated circuit (ASIC), a field-programmable gate array (FPGA), or other equivalent discrete or integrated logic circuitry. As noted above, individual servers of systems 22-28, 32-38, 42-48, 100, and 150 need not be instantiated on separate hardware.

Systems on SAP platform 10 can be defined by function. Where the workload of a particular system is high, the system can include a large number of application servers to distribute workload. Conversely, systems with relatively low workload may require fewer application servers. Systems having a large number of separate application servers can particularly benefit from the SAP start/stop utility disclosed herein, as discussed in detail below. Although less common, some systems may also include multiple database and/or message servers without departing from the contemplated scope of this disclosure. Some "dual stack" systems, for example, include both Java (SCS) and ABAP (ASCS) message servers.

As illustrated in FIG. 2, BI system 100 includes multiple distributed servers 102, and BI access portal system 150 analogously includes multiple distributed servers 152. Servers 102 and 152 include message servers 104 and 154, respectively. Message servers such as message server 104 and message server 154 are Software Communication Servers (SCS) or functional equivalents, and provide access, routing, and other data transmission services. These message servers can vary in type. For example, SAP platform 10 can support both Java-based (SCS) and Advanced Business Application Programming (ABAP)-based message servers (ASCS), distinguished as described in greater detail below with respect to FIGS. 3 and 4. In the illustrated embodiment, BI system 100 includes ABAP-based message server 104, while BI access portal system 150 includes Java-based message server 150, as denoted by differences in server naming convention. More generally, however, any appropriate set of message server protocols can be used and distinguished by type using sap_system_list.txt 56, as described in greater detail below.

As illustrated in FIG. 2, servers 102 and 152 include database servers 106 and 156, respectively. These database servers are responsible for storing persistent data related to the function of system 100 and 150, respectively, including scripts and other information used by the start/stop utility described herein, as set forth in more detail below. Servers 102 and 152 also each include multiple application servers 108 (108a-n) and 158 (158a-n), respectively, which host primarily or exclusively non-persistent instances of applications currently active or available with respect to BI system 100 and BI access portal system 150, respectively. As noted above, the number and specific content of application servers 108, 158 can vary depending on task type and computation load of systems 100, 150, respectively.

SAP platform 10, as introduced via FIGS. 1 and 2, is accessible to SAP admin 50. SAP admin 50 is an administrator terminal communicatively coupled to all environments of SAP, and more specifically to all systems (22-28, 32-38, 42-48, 100, 150) of these environments. SAP admin 50 includes user interface module 52 as a human interface with an administrator of SAP platform 10. User interface module 52 can, for example, take the form of a graphical user interface (GUI) configured to accept commands from a human administrator, and further configured to provide the human administrator with reports related to the function of SAP utility 200 (see FIGS. 3 and 4). User interface module 52 can, for example, provide graphical control elements through, e.g., a touch-sensitive and/or presence sensitive display screen, or a screen coupled to a separate keyboard, mouse, and/or other input device(s). A display of user interface module 52 can include a light-emitting diode (LED) display, an organic light-emitting diode (OLED) display, or other display device suitable for providing information to users in graphical form. User interface 52 is configured to present a human administrator with information as, for example, illustrated in FIGS. 5, 6, and 8 of this disclosure.

SAP platform 10 is provided with SAP start/stop utility 200 (see FIGS. 3 and 4) to facilitate batch startup, shutdown, and restarting of sets of servers within SAP platform 10. SAP start/stop utility 200 includes components distributed across SAP admin 50 (such as start_stop_system.ksh 54, sap_system_list.txt t 56, sap_system_list.test 58, and hugepage_systems.list 60) and across database servers (e.g. 106, 156) of each system on SAP platform 10 (start_stop_sap.ksh 110, stopclean.ksh 112, and sap_check_running.ksh 114). Although these components are depicted in FIGS. 1 and 2 as situated within database servers 106, 156 or on SAP admin 50, some components can in certain embodiments be stored in other locations, e.g. centrally or distributed to particular database servers, without departing from the general scope of the present disclosure.

Figure 3:
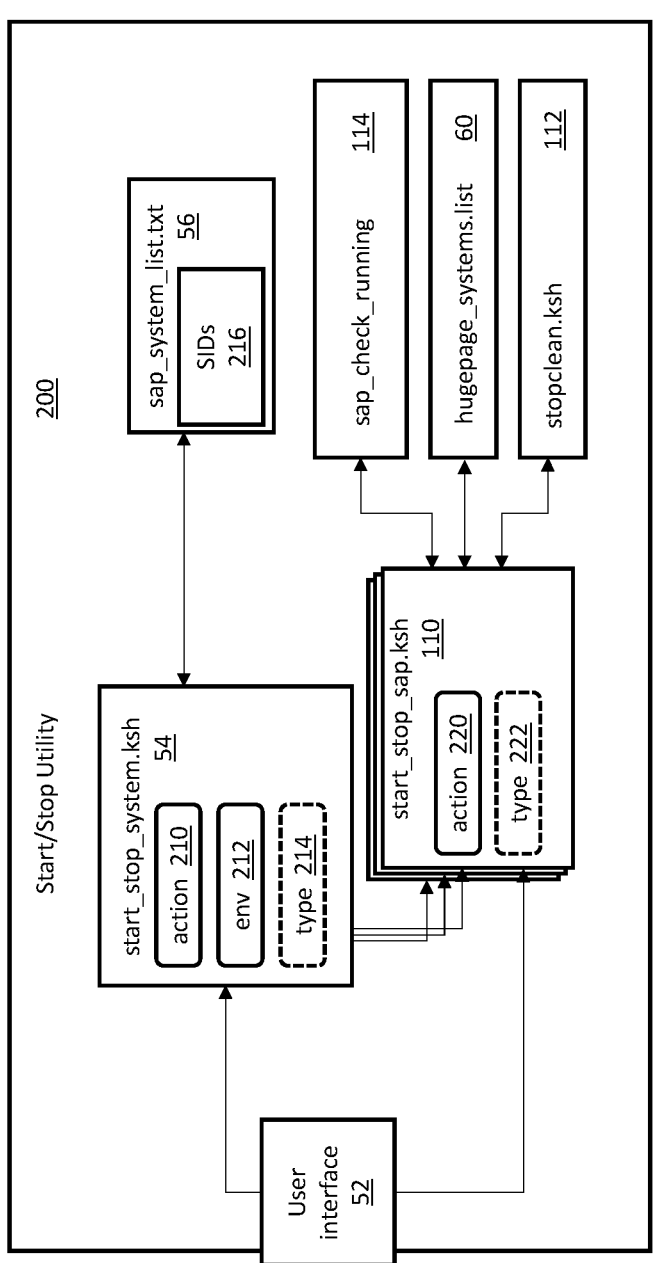
FIG. 3 is a functional block diagram illustrating script components making up an SAP start/stop utility distributed across the SAP platform of FIG. 1.
Figure 4:
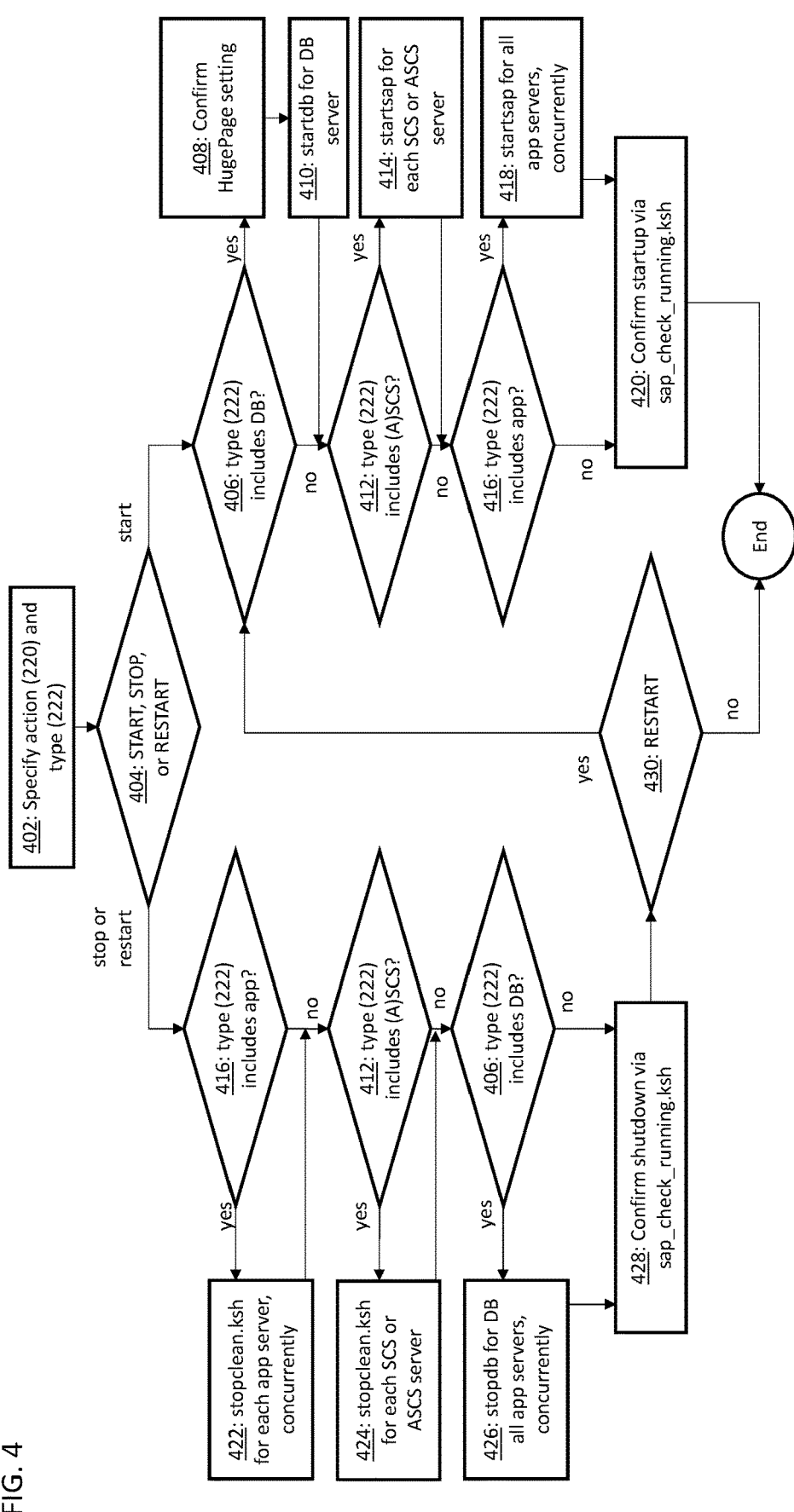
FIG. 4 is a method flowchart illustrating an individual system-level script executed using the SAP start/stop utility of FIG. 3.
Figure 5:
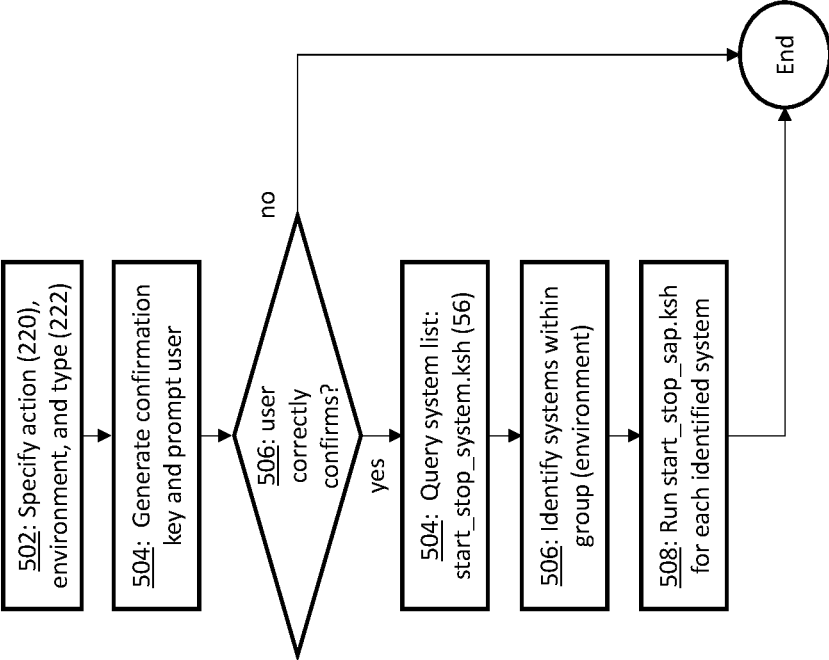
FIG. 5 is a method flowchart illustrating an system group-level script executed using the SAP start/stop utility of FIG. 3 and the individual system-level script of FIG. 3

FIG. 3 is a functional block diagram of SAP start/stop utility 200 illustrating the operation of and interactions between the various components of SAP start/stop utility 200 noted above with respect to FIGS. 1 and 2. FIGS. 4 and 5 are method flowcharts describing individual system-level and system group-level start/stop scripts used by SAP start/stop utility 200. FIGS. 3-5 are described together.

As noted above, SAP start/stop utility 200 includes start_stop_system.ksh 54, sap_system_list.txt 56, sap_system_list.test 58, start_stop_sap.ksh 110, stopclean.ksh 112, sap_check_running.ksh 114, and hugepage_systems.list 60. Of these, start_stop_system.ksh 54, start_stop_sap.ksh 110, stopclean.ksh 112, and sap_check_running.ksh 114 are scripts executed directly or indirectly by a human user to stop, start, and/or restart groups of servers within SAP platform 10, or to perform other necessary checks or cleanups associated with stopping or starting servers within SAP platform 10. Alongside these scripts, sap_system_list.txt 56, sap_system_list.test 58, and hugepage_systems.list 60 are lists or analogous record files referenced by start_stop_system.ksh 54 and/or start_stop_sap.ksh 110. All of these components are described in greater detail below.

Start_stop_sap.ksh 110 is an individual system-level SAP start/stop script used to stop, start, or restart all application, database, or message (SCS/ASCS) servers of a single system by successively establishing connections to each relevant server and calling standard SAP scripts (stopsap r3, startsap, stopdb, startdb) to stop, start, or stop and then start that server. For security purposes, start_stop_sap.ksh 110 can be runnable only by an admin user of the specific system (e.g. BI system 100) in which it is embedded at on which it acts.

The start_stop_sap.ksh script is located on the database server (e.g. DB 106, 156) of each system for which SAP start/stop utility is intended to be usable (e.g. in an admin directory, at/home/<sid>adm). Although instances of start_stop_sap.ksh are distributed to databases of each such system to be run locally in each system, these instances can all be identical. The instance of start_stop_sap.ksh 110 on database 106 of BI system 100 is used to start, stop, and restart message server 104, database server 106, and application servers 108, for example, while the instance of start_stop_sap.ksh 110 on database 156 of BI access portal system 150 would be used to start, stop, and restart message server 154, database server 156, and application servers 158, but each instance of start_stop_sap.ksh 110 can be an identical copy of the other. Differences in execution are accomplished by supplying start_stop_sap.ksh 110 with different arguments, or by reference to separate files, as described below.

The start_stop_sap.ksh script can, in an illustrative example, take 1 to 2 arguments: action 220 and type 222. Action 220 specifies the desired action that the script is to accomplish: either START, STOP, or RESTART. Type 222 specifies a subset of servers to in the specific system to be affected by action 220, e.g.: ALL (affecting all SAP/DB processes on all application, message (SCS/ASCS), and database servers of the system), NODB (starting/stopping all SAP processes on the application and message servers, but not affecting database processes), APPS (starting or stopping all SAP processes on application servers of the system), SCS (starting or stopping all SAP processes on message, i.e. SCS servers of the system), or DB (starting or stopping the system's database, e.g. Oracle DB). In some embodiments Type 222 may be an optional argument, with the scope of servers addressed by start_stop_sap.ksh applying to a default (e.g. ALL) in the absence of a second parameter. In such embodiments, start_stop_sap.ksh 110 can prompt an admin for confirmation if run directly (see below), if no type 222 parameter is provided. Start_stop_sap.ksh 110 iterates through all servers falling within the scope defined by type 222, making remote calls to (i.e. connecting to) each applicable application, message, and database server for the given system and calls appropriate standard scripts to start or stop each, as appropriate. For example, when action 220 is "START" and type 222 is "NODB" start_stop_sap.ksh 110 for BI system 100 will make connections to each application server 108 and to message server 104, and run startsap for each.

As illustrated in FIG. 4, which depicts the logic of start_stop_sap.ksh 110, arguments specifying action 220 and type 222 are provided when the script is run. (Step 402). Based on action 220, start_stop_sap.ksh engages in either shutdown (if RESTART or STOP are specified) or startup (if START is specified) of SAP processes. (Step 404).

When starting multiple types of servers, start_stop_sap.ksh first determines whether databases are included in the specification of type 222 (Step 406), then starts any Oracle database (e.g. database server 106) (Step 410). Specifically, start_stop_sap.ksh checks whether Oracle listener is running and attempts to start it, if not. If the listener cannot be started (and type 222 includes database servers), then start_stop_sap.ksh terminates. Start_stop_sap.ksh also determines whether the database server is configured to use HugePage settings by querying hugepage_systems.list 60, which lists the SIDs of all systems that utilize HugePage settings. (Step 408). If the SID for the system at issue is listed in hugepage_systems.list, start_stop_sap.ksh validates that HugePage settings have been set for the system's database server, and aborts if not.

After starting any Oracle database as required by scope defined by type 222, start_stop_sap.ksh 110 determines whether type 222 includes message servers (Step 412), and if so connects to and issues a standard "startsap" command to any message (SCS/ASCS) servers (e.g. 104) (Step 414). For dual stack systems, i.e. systems with both Java (SCS) and ABAP (ASCS) servers, start_stop_sap.ksh 110 starts both message servers in parallel. Once all message servers identified for startup or restart are started, start_stop_sap.ksh similarly evaluates whether type 222 includes application servers (Step 416) and, if so, establishes connections to each application server (if indicated by scope defined by type 222) (e.g. 108), and issues a standard "startsap" command to all such application servers concurrently (Step 418).

When start_stop_sap.ksh is tasked with stopping servers, servers are shut down in the reverse order to startup: first application servers, then message servers, then the Oracle database server, depending on scope as defined by type 222. Much as described above with respect to start actions, start_stop_sap.ksh first ascertains whether application servers are included in type 222 (Step 416), then establishes connections to and issues the "stopsap r3" command directly or indirectly to all application servers (e.g. 108), concurrently (Step 422). Once all applications have been stopped, this process is repeated for any message servers (e.g. 104), with start_stop_sap.ksh 110 ascertaining whether message servers are included in type 222 (Step 412), and if so issuing "stopsap r3" commands directly or indirectly to stop SAP processes for all SSC and/or ASCS servers (Step 424). After SAP processes have been halted for both message and application servers, start_stop_sap.ksh evaluates whether type 222 includes database servers (Step 406), and if so issues a "stopdb" command to the Oracle database server (Step 426).

In some embodiments, start_stop_sap.ksh 110 may stop SAP processes using stopclean.ksh 112 (i.e. at steps 422 and/or 424), as subscript collocated with start_stop_sap.ksh (e.g. in an admin home directory on each server where SAP processes are run) and likewise runnable only by an admin user. Stopclean.ksh 112 can, for example, receive a server identification as its sole argument. Stopclean.ksh 112 first stops SAP processes (via the standard "stopsap r3" command) for a specified server, then cleans up (i.e. extirpates any residual) inter-process communication (IPC) processes (via the standard "cleanipc" command).

After completing either startup or shutdown of SAP processes as specified by action 220 for all types of servers specified by type 222, start_stop_sap.ksh calls sap_check_running.ksh 114 (steps 420 and 428, respectively), another subscript collocated with start_stop_sap.ksh and runnable only by an admin user. Sap_check_running.ksh returns a status of all application, message, and/or database processes for a given system, and provides a confirmation that startup or shutdown of SAP processes (depending on action 220) has been accomplished as instructed. In the event that action 220 input to start_stop_sap.ksh 110 specifies "RESTART," start_stop_system.ksh proceeds first through all shutdown actions as set forth above, then through all startup actions. (Step 430). During such a restart, start_stop_sap.ksh can, for example, verify using sap_check_running.ksh that identified servers SAP processes have been shut down before beginning startup, then check that all systems have restarted as instructed using sap_check_running.ksh.

As noted above, SAP start/stop utility 200 is capable of starting and stopping SAP processes on specified types of servers across groups of systems. This is accomplished using start_stop_system.ksh 54, a group-level start/stop script that calls start_stop_sap.ksh 110 for each included system. The operation of start_stop_system.ksh 54 is illustrated in FIG. 5. In one embodiment, start_stop_system.ksh can be used to stop, start, or restart all application, message (SCS/ASCS), and/or database processes for a complete environment (e.g. development environment 20, QA environment 30, or production environment 40). More generally, however, start_stop_system.ksh can be used to automate startup, shutdown, and restart of any preset group of systems (e.g. 22-28, 32-38, 42-48, 100, 150). Start_stop_system.ksh 54 can, for example, be located in a home directory of SAP admin 50 (e.g. /home/sapadmin/bin), and in an exemplary embodiment must be run from SAP admin 50 by an admin user.

Because start_stop_system.ksh 54 can start or stop a large number of systems via a single command, start_stop_system.ksh 54 can require an explicit confirmation from an admin user before executing. This additional confirmation can, in some instances, be required only for restart or shutdown, but in other instances can also be required for startup using start_stop_system.ksh 54. FIG. 6 illustrates an example of such a confirmation in the form of a user interface printout 600 with confirmation key 602 and confirmation prompt 604. In the illustrated example, start_stop_system.ksh 54 generates a new confirmation key 602, which can for example be an alphanumeric string, whenever start_stop_system.ksh is run to stop or restart systems. In some illustrative alternatives, a confirmation key can also be generated, and confirmation required, for startup. In other examples, a confirmation key may only be required where a number of systems affected by the start_stop_system.ksh command (based on its arguments) exceeds a preset threshold (see below), or includes particular systems or environments for which disruption is especially undesirable. Start_stop_system.ksh 54 generates this pseudo-unique confirmation key 602 and prompts the admin user to re-enter confirmation key 602 at confirmation prompt 604 to avoid inadvertent system disruption. (Step 504). If the user correctly confirms the prompt (Step 506) start_stop_system.ksh executes; otherwise, it terminates.

Start_stop_system.ksh 54 can, in an illustrative embodiment, receive two to three arguments: action 210 (generally matching action 220, as described above), type 214 (an optional argument generally matching type 222, as described above), and environment 212. Environment 212 identifies a group of systems, e.g. a complete environment, within which all SAP systems will receive start/stop commands.

TABLE 1

| Example sap_system_list.txt | | | |
| --- | --- | --- | --- |
| environment | SID | type | appserver_count |
| DEV | BID | APAB | 2 |
| DEV | BZD | JAVA | 1 |
| DEV | H7D | JAVA | 3 |
| DEV | POD | JAVA | 1 |

TABLE 1-continued

| Example sap__system__list.txt | | | |
| --- | --- | --- | --- |
| environment | SID | type | appserver__count |
| QA | BIQ | APAB | 2 |
| QA | BZQ | JAVA | 3 |
| QA | H7Q | JAVA | 1 |
| QA | POQ | JAVA | 1 |
| PROD | BIP | ABAP | 5 |
| PROD | BZP | JAVA | 5 |
| PROD | H7P | JAVA | 7 |
| PROD | POP | JAVA | 6 |

Start_stop_system.ksh 54 queries sap_system_list.txt 56 (see above), a listing of SIDs 216 on SAP platform 10 with associated system information. (Step 504). Sap_system_list.txt 56 can, for example, be a tab delineated listing of all systems (by SID 216) in all environments (or other groupings, more generally) on SAP platform 10. Table 1 provides a non-limiting example of a hypothetical listing of related systems across development, QA, and production environments. Sap_system_list.txt 56 identifies all systems (by SID 216) associated with a given environment specifiable to start_stop_system.ksh 54 as environment (argument) 212, as well as the message server type (i.e. Java, ABAP, or dual-stack) and associated number of application servers for each such system.

Start_stop_system.ksh 54 identifies all systems matching specified environment 212 from sap_system_list.txt 56 (Step 506), and for each such system calls an instance of start_stop_sap.ksh 110 on that system database, passing through action and types parameters to start_stop_sap.ksh 110 (i.e. passing through action 210 from start_stop_system.ksh 54 to start_stop_sap.ksh 110 as action 220, and passing through type 214 from start_stop_system.ksh 54 to start_stop_sap.ksh 110 as action 222) (Step 508).

In some embodiments, a copy of sap_system_list.txt 56 used for testing or debugging (identified as sap_system_list.test 58 in FIG. 1) can also be provided test execution of start_stop_system.ksh 54 without starting or stopping servers on SAP platform 10. Sap_system_list.test 58 can be co-located on SAP admin 50 with sap_system_list.txt 56, and can be called when executing start_stop_system.ksh 54 to evaluate prospective changes. If sap_system_list.test 58 is referenced instead of sap_system_list.txt 56, start_stop_sap.ksh 54 will not enact any changes on servers of SAP platform 10 at steps 410, 414, 418, 422, 424, and/or 426.

As illustrated in FIG. 3, an admin user can run start_stop_system.ksh 54 from user interface 52. Start_stop_sap.ksh 110 will then be called by start_stop_system.ksh 54 in each relevant system. Alternatively, as also shown in FIG. 3, start_stop_sap.ksh 110 can be run directly from user interface 52 (i.e. rather than through start_stop_system.ksh 54), e.g. where the admin user only wishes to start, stop, or restart one or a small number of systems, or where the systems to be started/stopped/restarted do not match a preset grouping (e.g. an environment) specified in sap_system_list.txt 56.

After either start_stop_sap.ksh 110 or start_stop_system.ksh 54 completes, user interface 52 can be provided with a final report on the status of each server (for start_stop_sap.ksh 110) or system (for start_stop_system.ksh 54) specified when running the respective script, as generated by sap_check_running.ksh 114. For example, an administrator who runs start_stop_system.ksh 54 to shut down all servers of production environment systems can be provided with a list of statuses of each production environment system. In the event that some actions 210/220 were not completed (e.g. a system designated to be stopped could not be stopped, or a system designated to be started could not be started) SAP start/stop utility 200 can provide alert communicating this, or highlighting the unaffected systems, to the administrator.

SAP start/stop utility 200, through start_stop_sap.ksh 110 and start_stop_system.ksh 54, provides means for administrators of SAP platform 10 to efficiently, quickly, and non-disruptively stop, start, and restart groups of SAP servers on a per-system or system group (environment) basis, with the option of filtering by server type. SAP start/stop utility 200 thereby reduces administrator workload, minimizes downtime, and reduces the likelihood of error.

Discussion of Possible Embodiments

The following are non-exclusive descriptions of possible embodiments of the present invention.

A method of starting and stopping SAP processes across a plurality of servers on an SAP platform via an SAP start/stop utility, the method comprising: executing a system-scale SAP start/stop script by specifying an action and a type, the action identifying one of START, STOP, and RESTART, the type identifying categories of server to be stopped or started, the categories comprising database servers, message servers, and application servers; halting, via the system-scale SAP start/stop script and in response to the action including STOP or RESTART, in order, among servers in categories matching the type: application servers, message servers, and database servers; and subsequently starting, via the system-scale SAP start/stop script and in response to the action including START or RESTART, in order, among servers in categories matching the type: database servers, message servers, and application servers.

The method of the preceding paragraph can optionally include, additionally and/or alternatively, any one or more of the following features, configurations and/or additional components:

A further embodiment of the foregoing method, further comprising: evaluating, via the system-scale SAP start/stop script, a status of each server in a category matching the type; and reporting to an administrator user interface, via the system-scale SAP start/stop script, the status of each server in a category matching the type.

A further embodiment of the foregoing method, further comprising, prior to executing the system-scale SAP start-stop script: executing a system group-scale SAP start/stop script by specifying an action, a type, and an system group; and identifying systems within the system group via the group-scale SAP start/stop script; and wherein executing the system-scale SAP start/stop script comprises separately executing an instance of the system-scale SAP start/stop script local to each of the identified systems, using the action and type specified when executing the system group-scale SAP start/stop script.

A further embodiment of the foregoing method, wherein identifying systems within the group comprises comparing the system group to a record of systems, by group, using the system group-scale SAP start/stop script.

A further embodiment of the foregoing method, wherein the system group is a software environment, and the record of systems, by group, is a record of systems belonging to each environment.

A further embodiment of the foregoing method, wherein the record of systems further specifies at least one of a message server type and a number of application servers associated with each of the systems.

A further embodiment of the foregoing method, further comprising: generating, via the system-scale SAP start/stop script, a confirmation key; and prompting a user to reproduce the confirmation key; and confirming that the user has reproduced the confirmation key before halting any of the plurality of servers.

A further embodiment of the foregoing method, further comprising confirming HugePage settings before starting a database server.

A further embodiment of the foregoing method, wherein: an instance of the system-scale SAP stop/start script is saved locally within a database server of each of the systems; and the system group-scale SAP start/stop script is executed from an SAP admin terminal on the SAP platform but external to the systems.

A further embodiment of the foregoing method, wherein halting application and message servers via the system-scale SAP start/stop script comprises executing a stop/clean subscript for each such server, the stop/clean script configured to first terminate SAP processes on the respective server, then extirpates any residual inter-process communication (IPC) processes on the respective server.

An SAP platform comprising a plurality of servers, the SAP platform comprising: a plurality of software environments, each of the plurality of software environments comprising at least one system encompassing a database server, a message server, and an application server, all from among the plurality of servers; an SAP admin terminal communicatively coupled to all of the plurality of servers, the SAP admin terminal including a user interface; and an SAP start/stop utility distributed across the SAP admin terminal and each of the database servers, the SAP start/stop utility configured to: receive arguments via the user interface specifying an action and a server type; halt SAP processes on a subset of the plurality of servers matching the server type, in response to the action specifying STOP or RESTART; and start SAP processes on the subset of the plurality of servers matching the server type, in response to the action specifying START or RESTART.

The SAP platform of the preceding paragraph can optionally include, additionally and/or alternatively, any one or more of the following features, configurations and/or additional components:

A further embodiment of the foregoing SAP platform, wherein the database server is an Oracle database server.

A further embodiment of the foregoing SAP platform, wherein the message server is an SCS or ASCS server.

A further embodiment of the foregoing SAP platform, wherein the SAP start/stop utility is further configured to: generate a confirmation key; prompt a user to reproduce the confirmation key via the user interface; and confirm that the user has reproduced the confirmation key before halting any of the plurality of servers.

A further embodiment of the foregoing SAP platform, wherein the arguments received by the SAP start/stop utility via the user interface further specify at least one environment from among the plurality of environments, and wherein the SAP start/stop utility halts and/or stops only SAP processes on servers within systems falling within the at least one environment.

A further embodiment of the foregoing SAP platform, wherein the SAP start/stop utility is additionally configured to report a status of each system falling within the at least one environment.

A further embodiment of the foregoing SAP platform, wherein the SAP start/stop utility comprises: a system-scale SAP start/stop script configured to start and halt SAP processes; and a system group-scale SAP start/stop script configured to identify systems falling within the at least one environment, and call instances of the system-scale SAP start/stop script for each system falling within the at least one environment.

A further embodiment of the foregoing SAP platform, wherein both the system-scale SAP start/stop script and the system group-scale SAP start/stop script are directly runnable from the SAP admin terminal user interface, such that the system scale SAP start/stop script can be executed either directly by an administrator via the user interface, or indirectly by the system group-scale SAP start/stop script.

A further embodiment of the foregoing SAP platform, wherein: an instance of the system-scale SAP start/stop script is distributed to each of the database servers, such that execution of the system-scale SAP start/stop script for a particular system comprises running the system-scale SAP script stored locally on a respective database sever of the particular system.

A further embodiment of the foregoing SAP platform, wherein the system group-scale SAP start/stop script identifies systems walling within he at least one environment by reference to a record identifying the system makeup of each environment.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of starting and stopping System Analysis Program Development (SAP) processes across a plurality of servers on an SAP platform via an SAP start/stop utility, the method comprising:
   executing a system-scale SAP start/stop script by specifying an action and a type, the action identifying one of START, STOP, and RESTART, the type identifying categories of server to be stopped or started, the categories comprising database servers, message servers, and application servers;
   halting, via the system-scale SAP start/stop script and in response to the action including STOP or RESTART, in order, among servers in categories matching the type: application servers, message servers, and database servers; and subsequently starting, via the system-scale SAP start/stop script and in response to the action including START or RESTART, in order, among servers in categories matching the type: database servers, message servers, and application servers.

2. The method of claim 1, further comprising:

evaluating, via the system-scale SAP start/stop script, a status of each server in a category matching the type; and reporting to an administrator user interface, via the system-scale SAP start/stop script, the status of each server in a category matching the type.

3. The method of claim 1, further comprising, prior to executing the system-scale SAP start-stop script:

executing a system group-scale SAP start/stop script by specifying an action, a type, and an system group; and identifying systems within the system group via the group-scale SAP start/stop script; and wherein executing the system-scale SAP start/stop script comprises separately executing an instance of the system-scale SAP start/stop script local to each of the identified systems, using the action and type specified when executing the system group-scale SAP start/stop script.

4. The method of claim 3, wherein identifying systems within the group comprises comparing the system group to a record of systems, by group, using the system group-scale SAP start/stop script.

5. The method of claim 4, wherein the system group is a software environment, and the record of systems, by group, is a record of systems belonging to each environment.

6. The method of claim 4, wherein the record of systems further specifies at least one of a message server type and a number of application servers associated with each of the systems.

7. The method of claim 3, further comprising:

generating, via the system-scale SAP start/stop script, a confirmation key; and prompting a user to reproduce the confirmation key; and confirming that the user has reproduced the confirmation key before halting any of the plurality of servers.

8. The method of claim 1, further comprising confirming HugePage settings before starting a database server.

9. The method of claim 3, wherein:

an instance of the system-scale SAP stop/start script is saved locally within a database server of each of the systems; and the system group-scale SAP start/stop script is executed from an SAP admin terminal on the SAP platform but external to the systems.

10. The method of claim 1, wherein halting application and message servers via the system-scale SAP start/stop script comprises executing a stop/clean subscript for each such server, the stop/clean script configured to first terminate SAP processes on the respective server, then extirpates any residual inter-process communication (IPC) processes on the respective server.

11. A System Analysis Program Development (SAP) platform comprising a plurality of servers, the SAP platform comprising:

a plurality of software environments, each of the plurality of software environments comprising at least one sys-tem encompassing a database server, a message server, and an application server, all from among the plurality of servers;

an SAP admin terminal communicatively coupled to all of the plurality of servers, the SAP admin terminal including a user interface; and an SAP start/stop utility distributed across the SAP admin terminal and each of the database servers, the SAP start/stop utility configured to:

receive arguments via the user interface specifying an action and a server type;

halt SAP processes on a subset of the plurality of servers matching the server type, in response to the action specifying STOP or RESTART; and start SAP processes on the subset of the plurality of servers matching the server type, in response to the action specifying START or RESTART.

12. The SAP platform of claim 11, wherein the database server is an Oracle database server.

13. The SAP platform of claim 11, wherein the message server is an SCS or ASCS server.

14. The SAP platform of claim 11, wherein the SAP start/stop utility is further configured to:

generate a confirmation key;

prompt a user to reproduce the confirmation key via the user interface; and confirm that the user has reproduced the confirmation key before halting any of the plurality of servers.

15. The SAP platform of claim 11, wherein the arguments received by the SAP start/stop utility via the user interface further specify at least one environment from among the plurality of environments, and wherein the SAP start/stop utility halts and/or stops only SAP processes on servers within systems falling within the at least one environment.

16. The SAP platform of claim 15, wherein the SAP start/stop utility is additionally configured to report a status of each system falling within the at least one environment.

17. The SAP platform of claim 15, wherein the SAP start/stop utility comprises:

a system-scale SAP start/stop script configured to start and halt SAP processes; and a system group-scale SAP start/stop script configured to identify systems falling within the at least one environment, and call instances of the system-scale SAP start/stop script for each system falling within the at least one environment.

18. The SAP platform of claim 17, wherein both the system-scale SAP start/stop script and the system group-scale SAP start/stop script are directly runnable from the SAP admin terminal user interface, such that the system scale SAP start/stop script can be executed either directly by an administrator via the user interface, or indirectly by the system group-scale SAP start/stop script.

19. The SAP platform of claim 17, wherein:

an instance of the system-scale SAP start/stop script is distributed to each of the database servers, such that execution of the system-scale SAP start/stop script for a particular system comprises running the system-scale SAP script stored locally on a respective database sever of the particular system.

20. The SAP platform of claim 17, wherein the system group-scale SAP start/stop script identifies systems walling within he at least one environment by reference to a record identifying the system makeup of each environment.

* * * * *